United States Patent
Zhang et al.

(10) Patent No.: US 12,533,872 B2
(45) Date of Patent: Jan. 27, 2026

(54) FIBER-METAL LAMINATE HAVING HONEYCOMB SANDWICH STRUCTURE AND PREPARATION METHOD THEREOF

(71) Applicants: Beijing National Innovation Institute of Lightweight Ltd, Beijing (CN); Beijing National Innovation Institute of Lightweight Ltd Yantai Branch, Yantai (CN)

(72) Inventors: Quanda Zhang, Beijing (CN); Fuzhen Sun, Beijing (CN); Jirigele Yun, Beijing (CN); Huiyu Li, Beijing (CN); Xiaoxu Li, Beijing (CN)

(73) Assignees: Beijing National Innovation Institute of Lightweight Ltd, Beijing (CN); Beijing National Innovation Institute of Lightweight Ltd Yantai Branch, Yantai (CN)

( * ) Notice: Subject to any disclaimer, the term of this patent is extended or adjusted under 35 U.S.C. 154(b) by 84 days.

(21) Appl. No.: 18/665,524

(22) Filed: May 15, 2024

(65) Prior Publication Data

US 2024/0375390 A1 Nov. 14, 2024

Related U.S. Application Data

(63) Continuation of application No. PCT/CN2024/089438, filed on Apr. 24, 2024.

(30) Foreign Application Priority Data

May 8, 2023 (CN) .......................... 202310508167.8

(51) Int. Cl.
B32B 37/02 (2006.01)
B32B 3/12 (2006.01)
(Continued)

(52) U.S. Cl.
CPC ................ *B32B 37/02* (2013.01); *B32B 3/12* (2013.01); *B32B 5/02* (2013.01); *B32B 15/092* (2013.01);
(Continued)

(58) Field of Classification Search
CPC ....... B32B 37/02; B32B 37/10; B32B 37/146; B32B 3/12; B32B 15/18; B32B 15/20;
(Continued)

(56) References Cited

U.S. PATENT DOCUMENTS

| | | | | |
|---|---|---|---|---|
| 3,948,614 A | * | 4/1976 | Michalon | B32B 5/20 428/116 |
| 5,288,538 A | * | 2/1994 | Spears | E04C 2/34 428/116 |
| 2017/0246849 A1 | * | 8/2017 | Ilinich | B32B 37/06 |

FOREIGN PATENT DOCUMENTS

| | | | | |
|---|---|---|---|---|
| CN | 114603029 A | * | 6/2022 | ............. B21D 22/22 |
| CN | 115674732 A | * | 2/2023 | |

* cited by examiner

*Primary Examiner* — John L Goff, II

(57) ABSTRACT

A fiber-metal laminate having a honeycomb sandwich structure and a preparation method thereof are provided. Firstly, based on material reduction processing technology, a recessed polygonal structure is obtained according to a design trajectory, and an upper layer and a lower layer are closed to form a recessed honeycomb sandwich structure. Then, processed surfaces of the upper layer and the lower layer are chemically treated to passivate the processed surfaces, with the aim of increasing the adhesion between a fiber layer and the metal layers. Then, a viscous mixture is filled into the recessed structures of the metal layers to ensure the multifunctional characteristics and impact resistance of the fiber-metal laminate. Then, a fiber prepreg is laid (Continued)

between the upper layer and the lower layer to obtain a prefabricated fiber-metal laminate. Finally, the prefabricated fiber-metal laminate undergoes thermal curing treatment under pressure in a hot-pressing tank, thereby obtaining the fiber-metal laminate.

5 Claims, 3 Drawing Sheets

(51) Int. Cl.
| | |
|---|---|
| *B32B 5/02* | (2006.01) |
| *B32B 15/092* | (2006.01) |
| *B32B 15/14* | (2006.01) |
| *B32B 15/20* | (2006.01) |
| *B32B 27/20* | (2006.01) |
| *B32B 27/38* | (2006.01) |
| *B32B 37/10* | (2006.01) |
| *B32B 38/00* | (2006.01) |
| *B32B 38/08* | (2006.01) |

(52) U.S. Cl.
CPC .............. *B32B 15/14* (2013.01); *B32B 15/20* (2013.01); *B32B 27/20* (2013.01); *B32B 27/38* (2013.01); *B32B 37/10* (2013.01); *B32B 38/0004* (2013.01); *B32B 38/08* (2013.01); *B32B 2250/05* (2013.01); *B32B 2250/40* (2013.01)

(58) Field of Classification Search
CPC ... B32B 15/092; B32B 38/0004; B32B 38/08; B32B 38/162; B32B 2250/40; B32B 2605/18; B32B 2038/0084; B32B 2255/062; Y10T 156/1064; B29C 2793/0054
USPC .......................................... 156/257, 281, 79
See application file for complete search history.

US 12,533,872 B2

FIBER-METAL LAMINATE HAVING HONEYCOMB SANDWICH STRUCTURE AND PREPARATION METHOD THEREOF

TECHNICAL FIELD

The present disclosure relates to the technical field of design and preparation of high-performance composite materials, in particular to a fiber-metal laminate having a honeycomb sandwich structure and a preparation method thereof.

BACKGROUND

With the development of modern society, the widespread use of aircrafts with higher maneuverability and better stealth performance has become a key in the aerospace field. This requires the aircrafts to have lighter weight and more diverse functions. Specifically, lightweight and multifunctional materials and material structure technologies are keys to achieving the above purposes, i.e., the lighter weight and more diverse functions.

In terms of research progress in lightweight materials, a hybrid material structure system, called as fiber-metal laminates (FMLs), is formed by alternately laying resin-based fiber reinforced composite materials (i.e., fiber reinforced polymer (FRP)) and thinner metal plates. The FMLs are novel, efficient, and low-cost composite structural materials that combine the dual advantages of metal and advanced composite materials. Compared with aluminum alloys, the FMLs have better damage tolerance (especially tolerance of impact and fatigue), better corrosion resistance, better fire resistance, and lower density. Compared with composite materials, the FMLs have better impact resistance, better conductivity, recyclability, and strong designability. The FMLs are very popular in the use of the new generation of aircraft structural components. The FMLs have enormous potential for application in the aerospace field. Specifically, manufacturing costs and complexity of glass reinforced aluminum laminates (GLAREs) are higher than those of aluminum alloy sheets, but compared with metal structures, a surface density of GLAREs is lower, a service life of GLAREs is longer, and the inspection and maintenance of GLAREs during the service are simple. Compared with aluminum alloy components having the same volume with GLAREs, the mass of the GLAREs is reduced by more than 25%, while costs of the GLAREs are only about one-third of that of fiber reinforced composite materials having the same volume with the GLAREs. The GLAREs are widely used in fuselage skins, vertical and horizontal tail leading edges of the aircrafts to greatly improve endurance and maneuverability of the aircrafts, and the GLAREs are the most mature and popular FMLs in recent years. In terms of lightweight composite structures, traditional lightweight structures are mostly foam and honeycomb sandwich structures. The sandwich structure is a lightweight multifunctional structure, which is mainly composed of an upper panel, a lower panel, and an interlayer between the upper panel and the lower panel. The sandwich structure has shown superior performance in weight reduction, energy absorption, cost reduction, and production time. Compared a traditional single-layer panel, the sandwich structure has a higher porosity, thereby making the overall structure of the sandwich structure lighter in weight. The higher porosity and lower relative density of the sandwich structure make the sandwich structure exhibit better mechanical properties, making it be a good choice for achieving a design of lightweight. However, the interlayer of the sandwich structure is enclosed, making it difficult to achieve multifunctional requirements such as embedding and heat transfer, which limits the widespread use of the sandwich structure.

Therefore, by adopting innovative preparation techniques and combining a design method of honeycomb sandwich structure with the GLAREs, novel GLAREs having a sandwich structure is urgent to be developed. The novel GLAREs will further reduce the weight of the conventional GLAREs. At the same time, a scheme of filling the interlayer of the sandwich structure will achieve the integration of multiple functions (such as load-bearing, thermal control, stealth, energy absorption, actuation, energy storage, and damping), while the novel GLAREs can compensate for the weakening of strength and stiffness caused by weight reduction, the novel GLAREs can achieve the ultimate purposes of lightweight, miniaturization, diversification, and structural and functional integration, thereby expanding the application scope of the novel GLAREs in many fields (such as aerospace and national defense) and improving performance of aircraft.

SUMMARY

To solve the above problems, the present disclosure provides a fiber-metal laminate having a honeycomb sandwich structure and preparation method thereof. The preparation method involves a material structure design, precision machining technology, surface engineering, and heat treatment technology, and the preparation method can achieve the integration of design and manufacturing of lightweight and multifunctional fiber-metal reinforced laminates.

To achieve the above purposes, the present disclosure provides a fiber-metal laminate having a honeycomb sandwich structure and a preparation method thereof. The preparation method of the fiber-metal laminate includes the following steps.

Step 1, mechanical treatment: an aluminum alloy upper plate and an aluminum alloy lower plate are arranged by aligning edges of the aluminum alloy upper plate and the aluminum alloy lower plate (for example, a lower surface of the aluminum alloy upper plate is parallel with an upper surface of the aluminum alloy lower plate), a hexagonal machining trajectory is marked on an inner surface of the aluminum alloy upper plate, and a hexagonal machining trajectory is marked on an inner surface of the aluminum alloy lower plate to correspond to the hexagonal machining trajectory of the aluminum alloy upper plate in position; a cutting tool is used to cut the inner surface of the aluminum alloy upper plate along the hexagonal machining trajectory of the aluminum alloy upper plate while cutting a target depth along a thicknesswise direction of the aluminum alloy upper plate, thereby obtaining a cut aluminum alloy upper plate having a recessed hexagonal structure; and the cutting tool is further used to cut the inner surface of the aluminum alloy lower plate along the hexagonal machining trajectory of the aluminum alloy lower plate while using the cutting tool to cut a target depth along a thicknesswise direction of the aluminum alloy lower plate, thereby obtaining a cut aluminum alloy lower plate having a recessed hexagonal structure. In the step 1, according to the requirements of working conditions of the fiber-metal laminate, multiple cut areas (i.e., multiple recessed hexagonal structures) are mostly clustered, and multiple uncut areas (i.e., supporting parts) of the aluminum alloy plates are connected to the multiple cut areas; that is, unprocessed materials of the aluminum alloy plates form multiple supporting parts, and the multiple supporting parts are combined with the multiple recessed hexagonal structures to form the honeycomb sandwich structure. The cutting depths of the multiple recessed hexagonal structures along the thicknesswise direction are calculated based on the strength and impact resistance requirements of the cut aluminum alloy plates.

Step 2, surface chemical treatment: acetone is used to remove oil stains on the inner surface of the cut aluminum alloy upper plate and the inner surface of the cut aluminum alloy lower plate, then phosphorus phenol anodizing treatment is performed on the inner surface of the cut aluminum alloy upper plate and the inner surface of the cut aluminum alloy lower plate, thereby obtaining a treated aluminum alloy upper plate having a treated recessed hexagonal structure and a treated aluminum alloy lower plate having a treated recessed hexagonal structure. The phosphorus phenol anodizing treatment includes alkaline washing, acid washing, and phosphoric acid anodizing sequentially performed in that order; the phosphorus phenol anodizing treatment is performed to obtain a rough and uneven structure on an inner surface of the treated aluminum alloy upper plate and a rough and uneven structure on an inner surface of the treated aluminum alloy lower plate. The rough and uneven structure can increase surface roughness to increase contact areas between the aluminum alloy plates and a fiber prepreg, thereby enhancing a mechanical locking force between the aluminum alloy plates and resins.

Step 3, a high-temperature expansion agent, a multi-physical characteristic filler, and an epoxy resin are mixed to obtain a viscous mixture, and the viscous mixture is filled into the treated recessed hexagonal structure of the treated aluminum alloy upper plate and the treated recessed hexagonal structure of the treated aluminum alloy lower plate. The purpose of adding high-temperature expansion agent is that the high-temperature expansion agent will expand and flow when the treated aluminum alloy plates undergo thermal curing treatment, then the high-temperature expansion agent fully fills the recessed hexagonal structures of the treated aluminum alloy plates and forms a foam material, thereby providing a shock absorption effect. The addition of the multi-physical characteristic filler is to increase the functional diversity of fiber-metal laminate. The addition of the epoxy resin is to mix the high-temperature expansion agent with the multi-physical characteristic filler effectively, and the viscous mixture is easy to fill and fix in the recessed hexagonal structures of aluminum alloy laminates.

Step 4, a structural scheme of the fiber-metal laminate and a laying method of a fiber prepreg are designed based on actual needs, and the treated aluminum alloy upper plate filled with the viscous mixture and the treated aluminum alloy lower plate filled with the viscous mixture are laid; the fiber prepreg, the treated aluminum alloy upper plate filled with the viscous mixture, and the treated aluminum alloy lower plate filled with the viscous mixture are bonded to obtain a prefabricated fiber-metal laminate. The structural scheme of the fiber-metal laminate includes ½ (i.e., one layer of fiber prepreg and two layers of treated aluminum alloy plates), ⅔ (i.e., two layers of fiber prepregs and three layers of treated aluminum alloy plates), ¾ ((i.e., three layers of fiber prepreg and four layers of treated aluminum alloy plates), and ⅚ (i.e., five layers of fiber prepreg and six layers of treated aluminum alloy plates). The laying method of the fiber prepreg includes unidirectional laminate laying (0°/0° layering), orthogonal laminate laying (0°/90° laying), and orthogonal laminate laying (+45°/−45° laying).

Step 5, the prefabricated fiber-metal laminate is used to prepare a vacuum bag system, and then the vacuum bag system is placed in a hot-pressing tank (also referred to as autoclave); a target temperature and a target pressure of the hot-pressing tank are set to cured the fiber prepreg to make the fiber prepreg be firmly adhered to the prefabricated fiber-metal laminate, thereby obtaining the fiber-metal laminate having the honeycomb sandwich structure. The high-temperature expansion agent expands under the target temperature, and the high-temperature expansion agent is configured to fill recessed hexagonal structures of the prefabricated fiber-metal laminate to form the honeycomb sandwich structure which plays a role in reducing weight and absorbing energy.

The present disclosure provides a fiber-metal laminate having a honeycomb sandwich structure and a preparation method thereof. The present disclosure combines material structure design, precision machining technology of lightweight alloys, surface engineering technology, and heterogeneous composite material preparation technology in multiple dimensions according to a principle of providing lightweight and multifunctional materials for aerospace vehicles. Referring to characteristics and excellent functions of composite honeycomb hollow structures, the honeycomb sandwich structure of the present disclosure is obtained through mechanical processing in the fiber-metal laminate, and fillers are added to the recessed hexagonal structures according to a principle of reducing material. The purpose of the present disclosure is to design and prepare a fiber-metal laminate with a honeycomb sandwich structure. Compared with traditional fiber-metal laminates, the fiber-metal laminate of the present disclosure further reduces its weight. At the same time, the viscous mixture with multiple physical characteristics in each recessed hexagonal structure is fully filled the honeycomb sandwich structure in the form of foam after thermal curing treatment, thereby ensuring the structural consistency and performance diversity of the fiber-metal laminate. At the same time, the form of foam improves the overall energy absorption and impact resistance of the fiber-metal laminate, thereby promoting the widespread use of this lightweight and multifunctional material in the aerospace field.

First of all, a traditional preparation method of honeycomb sandwich structure is performed to prepare a honeycomb sandwich structure by adding a material, while the preparation method of the present disclosure is innovatively performed to prepare a honeycomb sandwich structure by reducing a material. The cutting tool moves along a machining trajectory while the cutting tool cut a target depth along a thicknesswise direction of respective aluminum alloy plates, thereby obtaining a recessed hexagonal structure. After the mechanical treatment, a supporting part is formed at an uncut area of the respective aluminum alloy plates. The supporting part is combined with the recessed hexagonal structure to form the recessed honeycomb sandwich structure which is lightweight and impact resistant. Then, in order to improve the bonding strength between the fiber layer and the metal layers and ensure the integrity of structure and function of the fiber-metal laminate, an aluminum alloy surface of the recessed hexagonal structure is subjected to phosphoric acid anodizing treatment to passivate the recessed hexagonal structure, and the mechanical locking force between the metal layers and the resins can be increased. Then, in order to ensure the multifunctional physical characteristics of the fiber-metal laminate and improve the impact resistance of the fiber-metal laminate, the high-temperature expansion agent, the multi-physical characteristic filler, and the epoxy resin are mixed to form the viscous mixture, the viscous mixture is easy to fill the recessed hexagonal structure and achieve the multifunctional characteristics of the fiber-metal laminate. Then, the structural scheme of the fiber-metal laminate and the laying method of the fiber prepreg are designed to select the number of plates (i.e., the number of aluminum alloy plates and the fiber prepreg), and the fiber prepreg laying technology is used to form the prefabricated fiber metal laminate. The structural scheme of the fiber-metal laminate includes ½ (i.e., one layer of fiber prepreg and two layers of treated aluminum alloy plates), ⅔ (i.e., two layers of fiber prepregs and three layers of treated aluminum alloy plates), ¾ ((i.e., three layers of fiber prepreg and four layers of treated aluminum alloy plates), and ⅚ (i.e., five fiber layers of prepreg and six layers of treated aluminum alloy plates). The laying method of the fiber prepreg includes unidirectional laminate laying (0°/0° layering), orthogonal laminate laying (0°/90° laying), and orthogonal laminate laying (+45°/−45° laying). Finally, the prefabricated fiber-metal laminate is made into a vacuum bag system, and the vacuum bag system is configured to reduce gases between the fiber layer and the metal layer by vacuuming, thereby ensuring a dense composite laminate is obtained during the thermal curing treatment. The vacuum bag system containing the prefabricated fiber metal laminate is placed in the hot-pressing tank. By setting the appropriate temperature and pressure, the curing of the fiber layer is achieved, and the bonding between the fiber layer and the metal layer is achieved, thereby obtaining a dense and integrated fiber-metal laminate. The high-temperature expansion agent expands under the action of the appropriate temperature, then the high-temperature expansion agent and the filler with multiple physical characteristics fully fill the honeycomb sandwich structure. The viscous mixture in a form of foam not only helps to improve the impact resistance of the fiber-metal laminate, but also has multifunctional characteristics of the filler, realizing the integrated design and manufacturing of the fiber-metal laminate.

In order to meet the urgent requirements of lightweight and multifunctional materials for aircraft with more flexible maneuverability and superior stealth, a design method of honeycomb sandwich structure is combined with the glass reinforced aluminum laminate based on lightweight material structure design and preparation technology. By utilizing the principle of material reduction technology and precision metal processing technology, it is easy to obtain the honeycomb sandwich structure. By selecting the composition of the multi-physical characteristic filler and optimizing the structural scheme of the fiber-metal laminate, the lightweight and multifunctional fiber metal laminates not only have important application value in the aerospace field, but also have huge market potential in future ship applications and new energy vehicles.

DESCRIPTION OF REFERENCE NUMERALS

1—aluminum alloy upper plate; 2—aluminum alloy lower plate; 3—cut aluminum alloy upper plate; 4—cut aluminum alloy lower plate; 5—supporting part; 6—recessed hexagonal structure; 10—treated aluminum alloy upper plate; 11—treated aluminum alloy lower plate; 12—rough and uneven structure; 13—fiber prepreg; 14—viscous mixture; 15—prefabricated fiber-metal laminate; 16—vacuum bag system; 17—hot-pressing tank.

DETAILED DESCRIPTION OF EMBODIMENTS

A fiber-metal laminate having a honeycomb sandwich structure and preparation method thereof provided by the present disclosure will be described in detail below with reference to the drawings and specific embodiments.

Figure 1:
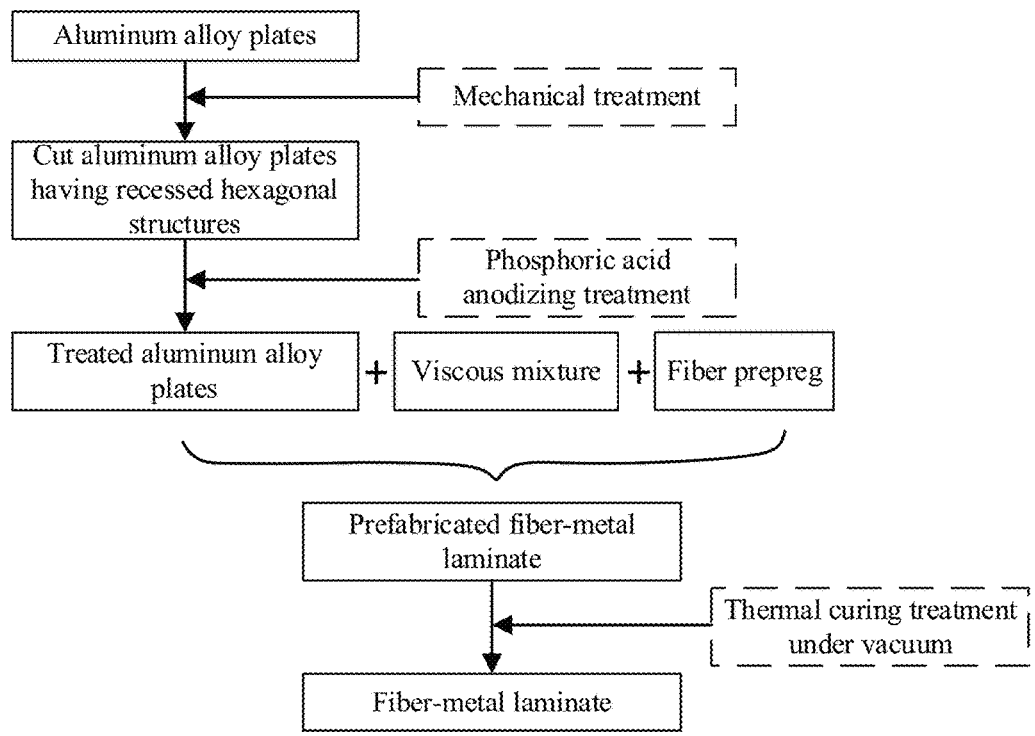
FIG. 1 illustrates a flowchart of a preparation method of a fiber-metal laminate having a honeycomb sandwich structure in the present disclosure.
Figure 2:
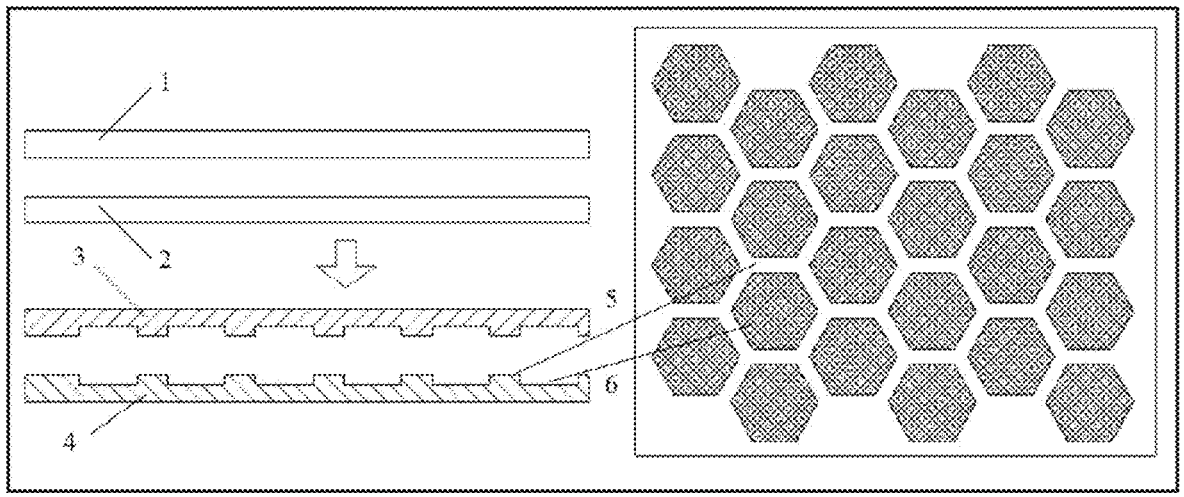
FIG. 2 illustrates a process of mechanical treatment of an aluminum alloy upper plate and an aluminum alloy lower plate in the present disclosure.
Figure 3:
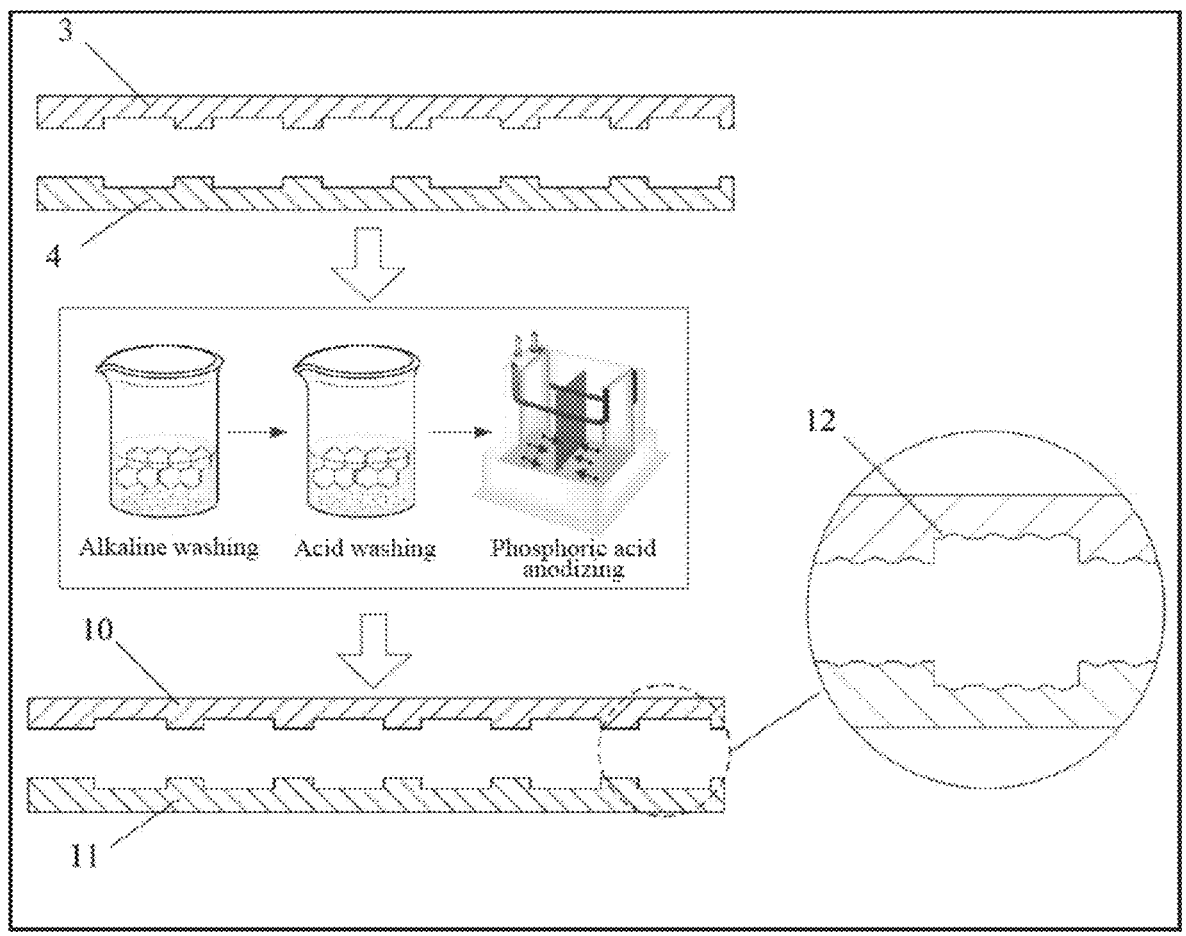
FIG. 3 illustrates a process of surface chemical treatment of a cut aluminum alloy upper plate and a cut aluminum alloy lower plate in the present disclosure.
Figure 4:
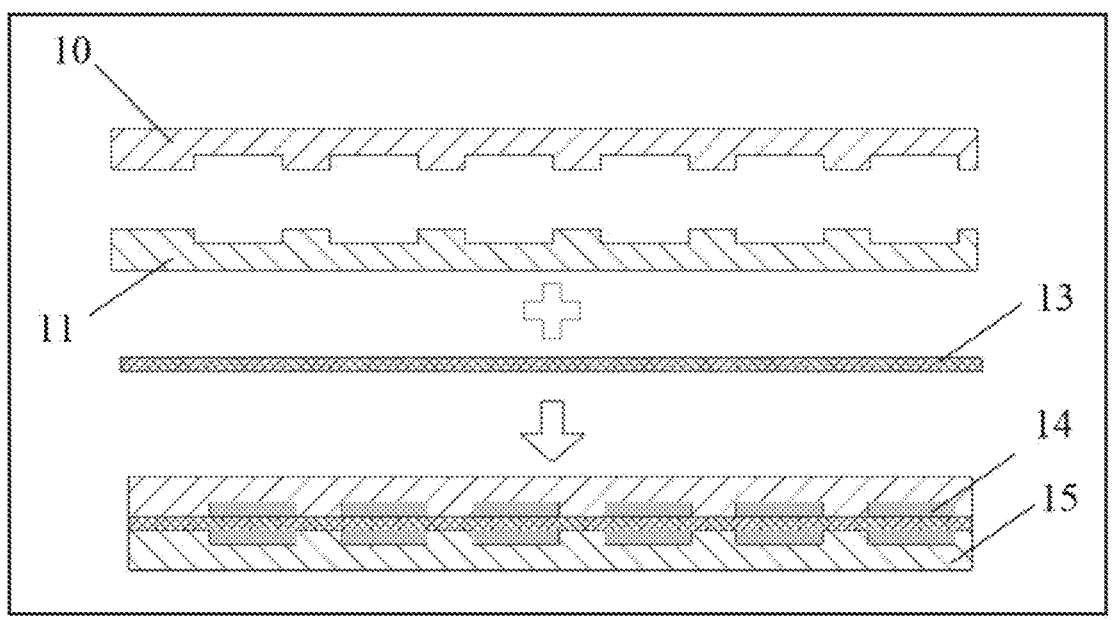
FIG. 4 illustrates a process of preparing a prefabricated fiber-metal laminate in the present disclosure.
Figure 5:
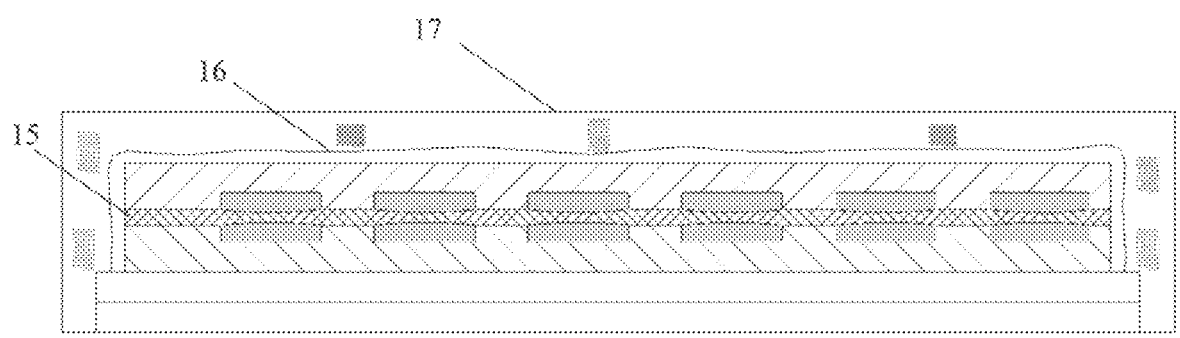
FIG. 5 illustrates a process of thermal curing treatment of the prefabricated fiber-metal laminate in a hot-pressing tank in the present disclosure.

Referring to FIG. 1 to FIG. 5, a fiber-metal laminate having a honeycomb sandwich structure and preparation method thereof are provided. The preparation method for the fiber-metal laminate includes the following steps.

Step 1, mechanical treatment: an aluminum alloy upper plate 1 and an aluminum alloy lower plate 2 are arranged by aligning edges of the aluminum alloy upper plate 1 and the aluminum alloy lower plate 2, a hexagonal machining trajectory is marked on an inner surface of the aluminum alloy upper plate 1, and a hexagonal machining trajectory is marked on an inner surface of the aluminum alloy lower plate 2 to correspond to the hexagonal machining trajectory of the aluminum alloy upper plate 1 in position; a cutting tool is used to cut the inner surface of the aluminum alloy upper plate 1 along the hexagonal machining trajectory of the aluminum alloy upper plate 1 while cutting a target depth along a thicknesswise direction of the aluminum alloy upper plate 1, thereby obtaining a cut aluminum alloy upper plate 3 having a recessed hexagonal structure 6; and the cutting tool is further used to cut the inner surface of the aluminum alloy lower plate 2 along the hexagonal machining trajectory of the aluminum alloy lower plate 2 while using the cutting tool to cut a target depth along a thicknesswise direction of the aluminum alloy lower plate 2, thereby obtaining a cut aluminum alloy lower plate 2 having a recessed hexagonal structure 6.

Step 2, surface chemical treatment: acetone is used to remove oil stains on the inner surface of the cut aluminum alloy upper plate 3 and the inner surface of the cut aluminum alloy lower plate 4, then phosphorus phenol anodizing treatment is performed on the inner surface of the cut aluminum alloy upper plate 3 and the inner surface of the cut aluminum alloy lower plate 4, thereby obtaining a treated aluminum alloy upper plate 10 having a treated recessed hexagonal structure 6 and a treated aluminum alloy lower plate 11 having a treated recessed hexagonal structure 6. The phosphorus phenol anodizing treatment includes alkaline washing, acid washing, and phosphoric acid anodizing sequentially performed in that order; the phosphorus phenol anodizing treatment is performed to obtain a rough and uneven structure 12 on an inner surface of the treated aluminum alloy upper plate 10 and a rough and uneven structure 12 on an inner surface of the treated aluminum alloy lower plate 11. The rough and uneven structure 12 can increase surface roughness to increase contact areas between the aluminum alloy plates and a fiber prepreg, thereby enhancing mechanical locking forces between the aluminum alloy plates and resins.

Step 3: a high-temperature expansion agent, a multi-physical characteristic filler, and an epoxy resin are mixed to obtain a viscous mixture 14; the viscous mixture 14 is filled into the treated recessed hexagonal structure 6 of the treated aluminum alloy upper plate 10 and the treated recessed hexagonal structure 6 of the treated aluminum alloy lower plate 11.

Step 4: a structural scheme of the fiber-metal laminate and a laying method of a fiber prepreg 13 are designed based on actual needs, the treated aluminum alloy upper plate 10 filled with the viscous mixture 14 and the treated aluminum alloy lower plate 11 filled with the viscous mixture 14 are laid manually; the fiber prepreg 13, the treated aluminum alloy upper plate 10 filled with the viscous mixture 14, and the treated aluminum alloy lower plate 11 filled with the viscous mixture 14 are bonded together, thereby obtaining a prefabricated fiber-metal laminate 15.

Step 5: the prefabricated fiber-metal laminate 15 is used to prepare a vacuum bag system 16, and then the vacuum bag system 16 is placed in a hot-pressing tank 17; a target temperature and a target pressure of the hot-pressing tank 17 are set to cured the fiber prepreg 13 to make the fiber prepreg 13 be firmly adhered to the prefabricated fiber-metal laminate 15, thereby obtaining the fiber-metal laminate.

Furthermore, the target temperature is in a range of 150° C. to 180° C. In some embodiments, the target temperature can be 150° C., 160° C., 170° C., or 180° C. Preferably, the target pressure of the hot-pressing tank 17 is set to −0.1 MPa.

What is claimed is:

1. A preparation method for a fiber-metal laminate having a honeycomb sandwich structure, comprising:

step 1, mechanical treatment: arranging an aluminum alloy upper plate (1) and an aluminum alloy lower plate (2) by aligning edges of the aluminum alloy upper plate (1) and aluminum alloy lower plate (2), marking a hexagonal machining trajectory on an inner surface of the aluminum alloy upper plate (1), and marking a hexagonal machining trajectory on an inner surface of the aluminum alloy lower plate (2), the hexagonal machining trajectory of the aluminum alloy lower plate (2) corresponding to the hexagonal machining trajectory of the aluminum alloy upper plate (1) in position; moving a cutting tool along the hexagonal machining trajectory of the aluminum alloy upper plate (1) and cutting off, by the cutting tool, a target depth of the aluminum alloy upper plate (1) along a thicknesswise direction of the aluminum alloy upper plate (1), thereby obtaining a cut aluminum alloy upper plate (3) having a recessed hexagonal structure (6); and moving the cutting tool along the hexagonal machining trajectory of the aluminum alloy lower plate (2) and cutting off, by the cutting tool, the target depth of the aluminum alloy lower plate (2) along a thicknesswise direction of the aluminum alloy lower plate (2), thereby obtaining a cut aluminum alloy lower plate (4) having a recessed hexagonal structure (6);

step 2, surface chemical treatment: using acetone to remove oil stains on the inner surface of the cut aluminum alloy upper plate (3) and the inner surface of the cut aluminum alloy lower plate (4), then performing phosphorus phenol anodizing treatment on the inner surface of the cut aluminum alloy upper plate (3) and the inner surface of the cut aluminum alloy lower plate (4), thereby obtaining a treated aluminum alloy upper plate (10) having a treated recessed hexagonal structure (6) and a treated aluminum alloy lower plate (11) having a treated recessed hexagonal structure (6); wherein the phosphorus phenol anodizing treatment comprises alkaline washing, acid washing, and phosphoric acid-anodizing sequentially performed in that order; the phosphorus phenol anodizing treatment is performed to obtain a rough and uneven structure (12) on an inner surface of the treated aluminum alloy upper plate (10) and a rough and uneven structure (12) on an inner surface of the treated aluminum alloy lower plate (11), increase surface roughness of the treated aluminum alloy upper plate (10) and the treated aluminum alloy lower plate (11), enhance a mechanical locking force between the treated aluminum alloy upper plate (10) and an epoxy resin, and enhance a mechanical locking force between the treated aluminum alloy lower plate (11) and the epoxy resin;

step 3, mixing an expansion agent, a multi-physical characteristic filler, and the epoxy resin to obtain a viscous mixture (14), and filling the viscous mixture (14) into the treated recessed hexagonal structure (6) of the treated aluminum alloy upper plate (10) and the treated recessed hexagonal structure (6) of the treated aluminum alloy lower plate (11);

step 4, designing a structural scheme of the fiber-metal laminate and a laying method of a fiber prepreg (13) based on an actual need of the fiber-metal laminate; and based on the structural scheme and the laying method, laying the treated aluminum alloy upper plate (10) filled with the viscous mixture (14) and the treated aluminum alloy lower plate (11) filled with the viscous mixture (14) and bonding the fiber prepreg (13), the treated aluminum alloy upper plate (10) filled with the viscous mixture (14), and the treated aluminum alloy lower plate (11) filled with the viscous mixture (14) together, thereby obtaining a prefabricated fiber-metal laminate (15); and step 5: using the prefabricated fiber-metal laminate (15) to prepare a vacuum bag system (16), and then placing the vacuum bag system (16) in a hot-pressing tank (17) to make the hot-pressing tank (17) to work under a target temperature and a target pressure to cure the fiber prepreg (13) to thus make the fiber prepreg (13) be firmly adhered to aluminum alloy plates in the prefabricated fiber-metal laminate (15), thereby obtaining the fiber-metal laminate having the honeycomb sandwich structure.

2. The preparation method for the fiber-metal laminate having the honeycomb sandwich structure as claimed in claim 1, wherein for a traditional honeycomb sandwich structure preparation method, a honeycomb sandwich structure is prepared by material addition; while for the preparation method, the honeycomb sandwich structure of the fiber-metal laminate is prepared by material reduction, and thus the preparation method is more convenient than the traditional honeycomb sandwich structure preparation method;

wherein after the mechanical treatment, when the cut aluminum alloy upper plate (3) and the cut aluminum alloy lower plate (4) are combined, uncut areas of the cut aluminum alloy upper plate (3) and the cut aluminum alloy lower plate (4) are configured to form supporting portions, and the supporting portions are combined with the recessed hexagonal structures (6) of the cut aluminum alloy upper plate (3) and the cut aluminum alloy lower plate (4) to form the honeycomb sandwich structure of the fiber-metal laminate; and the honeycomb sandwich structure is lightweight and impact resistant.

3. The preparation method for the fiber-metal laminate having the honeycomb sandwich structure as claimed in claim 1, further comprising:
   optimizing, according to the actual need of the fiber-metal laminate, a shape, a depth, and a distribution amount of the honeycomb sandwich structure to achieve a balance between lightweight and multifunctional characteristics of the fiber-metal laminate, and to make the fiber-metal laminate designable.

4. The preparation method for the fiber-metal laminate having the honeycomb sandwich structure as claimed in claim 1, wherein a use temperature of the expansion agent is consistent with a thermosetting temperature range of the fiber-metal laminate; when the fiber prepreg (13) undergoes thermal curing treatment, the fiber prepreg (13) and the aluminum alloy plates in the prefabricated fiber-metal laminate (15) together form a dense structure, to make the expansion agent completely fill into the honeycomb sandwich structure for providing impact resistance, thereby achieving an integrated design and manufacturing of the fiber-metal laminate having the honeycomb sandwich structure.

5. The preparation method for the fiber-metal laminate having the honeycomb sandwich structure as claimed in claim 1, further comprising:
   selecting a composition of the multi-physical characteristic filler; and
   optimizing the structural scheme of the fiber-metal laminate to improve the environmental durability of the fiber-metal laminate, the environmental durability comprising temperature and humidity effects, flame retardancy, and corrosion resistance;
   the fiber-metal laminate configured to be applied in ships; and
   the fiber-metal laminate configured to be applied in automobile body shells to achieve goals of reducing vehicle weight, improving speed, saving fuel, reducing vibration and noise, and enhancing transportation capacity, thereby realizing strong desire of consumers for needs of speed, energy-saving, lightweight, comfort, durability, and safety of future automobiles.

* * * * *